US006496750B1

(12) United States Patent
Yoon et al.

(10) Patent No.: US 6,496,750 B1
(45) Date of Patent: Dec. 17, 2002

(54) SYSTEM AND METHOD FOR PROCESSING CRANK ANGLE SIGNALS

(75) Inventors: Hyoung-Jin Yoon, Seongnam (KR); Jeong-Soo Eo, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/473,856

(22) Filed: Dec. 28, 1999

(30) Foreign Application Priority Data

Jul. 21, 1999 (KR) .......................................... 99-29549

(51) Int. Cl.[7] .............................................. G06F 19/00

(52) U.S. Cl. .................... 700/186; 700/169; 123/406.3

(58) Field of Search ........................... 700/58, 60, 169, 700/186, 259, 189; 123/406.3, 480, 90.15; 701/104, 102

(56) References Cited

U.S. PATENT DOCUMENTS 4,709,334 A * 11/1987 Abe et al. ................... 123/480
5,937,808 A * 8/1999 Kako et al. .............. 123/90.15
5,957,095 A * 9/1999 Kako ...................... 123/90.15
6,073,611 A * 6/2000 Ohuchi et al. .............. 123/1 A
6,092,015 A * 7/2000 Takahashi et al. ..... 123/406.34

* cited by examiner

*Primary Examiner*—Leo Picard
*Assistant Examiner*—Kidest Bahta
(74) *Attorney, Agent, or Firm*—Christie, Parker & Hale, LLP

(57) ABSTRACT

Disclosed is a system and method for processing crank angle signals. The system comprises a crank angle sensor for converting a rotation of a crankshaft into analog signals; a switching circuit for converting the analog signals into crank angle signals; a timer/counter for detecting a number of pulses and tooth periods of the crank angle signals; a phase sensor for converting a rotation of a camshaft into cylinder identity signals and outputting the cylinder identity signals; and an electronic control unit for receiving the crank angle signals and the cylinder identity signals and using the signals to determine cylinder identity and rpm. The method comprises the steps of inputting a crank angle signal and a cylinder identity signal; determining if the cylinder identity signal has undergone inversion from a high to low state or vice versa; establishing a point at which the cylinder identity signal undergoes inversion as a reference position; counting a predetermined number of pulses of the crank angle signal after the reference position if the cylinder identity signal does not undergo inversion; and identifying a point at which the predetermined number of the pulses of the crank angle signal is counted as a particular cylinder.

17 Claims, 9 Drawing Sheets

SYSTEM AND METHOD FOR PROCESSING CRANK ANGLE SIGNALS

BACKGROUND OF THE INVENTION (a) Field of the Invention

The present invention relates to a system and method for processing crank angle signals.

(b) Description of the Related Art

Increasingly precise electronic control of engines is being employed in recent times to enhance overall engine performance, decrease fuel consumption, limit exhaust emmisions and improve ride comfort. Examples of such control include fuel injection control, ignition timing control and engine misfire control.

To perform such precise engine control, a system and method for processing crank angle signals is required to precisely detect engine rpm changes, rotation angle of a crankshaft, and a cylinder in which a misfire occurs. In the conventional system and method for processing crank angle signals, a plurality of evenly-spaced teeth are provided on a sensor wheel, which is connected to a crankshaft to rotate with the same. A predetermined space at a particular location is provided where the teeth are formed on the sensor wheel (i.e., where teeth are missing), and the space is positioned so that it may be used as a control reference location, indicating top dead center (TDC) for a particular piston within its cylinder. It is from this point that a predetermined crank angle is measured and converted into a number of rotations of the crankshaft.

Also, a phase sensor determines which piston is at TDC of a compression stroke when the crank angle sensor generates a signal, and the cylinder identity signal is generated on every rotation of a camshaft. On the basis of this information, an engine control system performs fuel injection control, ignition timing control, and engine misfire control.

FIG. 1*a* shows a crank angle signal sensing method in the conventional system.

In the crank angle signal sensing method shown in FIG. 1*a,* a distance between a tooth and a bottom of a space between an adjacent tooth of the sensor wheel connected to the crankshaft is detected by a magnetic pickup, with a high value corresponding to the teeth and a low value corresponding to the bottom of the space between the teeth. Accordingly, in the case where one revolution of the engine corresponds to 16 teeth and a space of two missing teeth, tooth periods generated every 20° are observed, and if a tooth period is greater than or equal to twice a previous period, a missing tooth period is deemed to have occurred.

If it is determined that a missing tooth period has occurred, it is determined that a particular piston is at a TDC. The moment this occurs is used as a standard location, and from this point, a time for a 180° crankshaft rotation is measured, and this information is used to determine a number of rotations per minute (rpm).

FIG. 1*b* shows a waveform of a cylinder identity signal used to discern which cylinder is at a compression TDC.

The phase sensor is linked with the camshaft to generate a cylinder identity signal with every rotation of the camshaft. When a low value of the cylinder identity signal is set to signify the compression stroke of a first cylinder, in the case where the missing tooth period of the crank angle sensor is detected while the cylinder identity signal is low, it is deemed that the first cylinder has reached TDC on its compression stroke.

However, since engine speeds can abruptly experience a certain degree of variation in a low speed state or low temperature state where viscosity resistance of the oil increases, there occurs a significant increase in how such variation in engine speed influences the determination of the missing tooth period. That is, with such circumstances in the prior art method, a ratio of the missing tooth period to a previous tooth period becomes less than two such that the reliability of determining the missing tooth period is reduced.

Further, with vehicles using engines of a small displacement, since the number of teeth provided on the sensor wheel is reduced as a result of size limits, cold starts are not possible.

SUMMARY OF THE INVENTION

The present invention has been made in an effort to solve the above problems.

It is an object of the present invention to provide a system and method for processing crank angle signals in which the reliability of determining a missing tooth period is improved in both low speed and low temperature states, and in which cold starts are possible.

To achieve the above object, the present invention provides a system and method for processing crank angle signals. The system comprises a crank angle sensor for converting a rotation of a crankshaft into analog signals; a switching circuit for converting the analog signals into crank angle signals; a timer/counter for detecting a number of pulses and tooth periods of the crank angle signals; a phase sensor for converting a rotation of a camshaft into cylinder identity signals and outputting the cylinder identity signals; and an electronic control unit for receiving the crank angle signals and the cylinder identity signals and using the signals to determine cylinder identity and rpm.

According to a feature of the present invention, the crank angle sensor comprises a sensor wheel having a plurality of teeth formed at predetermined intervals around a circumference of the sensor wheel, the sensor wheel being connected to the crankshaft; and a magnetic pickup for detecting variations in a magnetic field caused by a difference in distance between the teeth of sensor wheel and the magnetic pickup, and between a bottom portion between the teeth of the sensor wheel and the magnetic pickup, the difference in distance occurring as a result of a rotation of the sensor wheel.

According to another feature of the present invention, the timer/counter establishes points at which the cylinder identity signals, which are output from the phase sensor, undergo inversion from high to low states or vice versa as reference positions, then starting from the reference positions counts and outputs the pulses of the crank angle signals, and calculates and outputs a time until a predetermined number of the pulses is counted.

According to yet another feature of the present invention, the electronic control unit receives the number of pulses of the crank angle signals output from the timer/counter, then identifies a cylinder corresponding to the input pulses and calculates engine rpm based on the time until the predetermined number of the pulses is counted as determined by the timer/counter.

The method comprises the steps of inputting a crank angle signal and a cylinder identity signal; determining if the cylinder identity signal has undergone inversion from a high to low state or vice versa; establishing a point at which the cylinder identity signal undergoes inversion as a reference position; counting a predetermined number of pulses of the crank angle signal after the reference position if the cylinder identity signal does not undergo inversion; and identifying a point at which the predetermined number of pulses of the crank angle signal is counted as a point corresponding to a particular cylinder.

According to a feature of the present invention, the cylinder identity signal is a signal having a single short pulse, a signal having a pulse extending over half a period of the cycle, or a signal having two pulses of different widths.

In another aspect, the method comprises the steps of inputting a cylinder identity signal output from a phase sensor and a crank angle signal to a timer/counter, the cylinder identity signal being a signal having a single short pulse; determining, by the timer/counter, if the pulse of the cylinder identity signal has undergone inversion from low to high; establishing, if it is determined that the pulse of the cylinder identity signal has undergone inversion, a point at which the cylinder identity signal undergoes inversion as a reference position and calculating rpm at this point, the establishment of the reference position and calculation of rpm being performed in an electronic control unit; counting, one at a time, a number of pulses of the crank angle signal by the timer/counter if the cylinder identity signal does not undergo inversion; determining if the number of pulses of the crank angle signal has reached a predetermined number; determining that a particular cylinder has reached TDC at a point where the number of pulses of the crank angle signal reaches the predetermined number; and initializing the timer/counter when the number of pulses of the crank angle signal counted by the timer/counter and a result of dividing the number of pulses of the crank angle signal during one period by a number of cylinders are the same.

According to a feature of the present invention, the method further comprises the step of continuously counting the pulses of the crank angle signals during one period without initializing the timer/counter.

In yet another aspect, the method comprises the steps of inputting a cylinder identity signal output from a phase sensor and a crank angle signal to a timer/counter, the cylinder identity signal being a signal having a pulse extending over half a period of the cycle; determining, by the timer/counter, if the pulse of the cylinder identity signal has undergone inversion; initializing the timer/counter, then establishing, by an electronic control unit, a point at which the cylinder identity signal undergoes inversion as a reference position, the initialization of the timer/counter and the establishing of the reference position being performed if it is determined that the pulse of the cylinder identity signal has undergone inversion from low to high; counting a number of pulses of the crank angle signal by the timer/counter if the cylinder identity signal does not undergo inversion; determining if the number of pulses of the crank angle signal has reached a predetermined number for engine control; determining that a particular cylinder has reached TDC at a point where the number of pulses of the crank angle signal reaches the predetermined number; determining if the number of pulses of the crank angle signal counted by the timer/counter equals a sum of the predetermined number of pulses of the crank angle signal and a result of dividing the number of pulses of the crank angle signal during one period by a number of cylinders; and determining that a subsequent cylinder has reached TDC by the electronic control unit at a point where the number of pulses of the crank angle signal counted by the timer/counter equals the sum.

According to a feature of the present invention, in the step of determining, by the timer/counter, if the pulse of the cylinder identity signal has undergone inversion, a point where the pulse of the cylinder identity signal undergoes inversion from high to low and from low to high is established as the reference position.

In still yet another aspect, the method comprises the steps of inputting a cylinder identity signal output from a phase sensor and a crank angle signal to a timer/counter, the cylinder identity signal being a signal having two pulses of different widths; determining, by the timer/counter, if the pulse of the cylinder identity signal has undergone inversion from low to high; initializing the timer/counter, establishing a point at which the cylinder identity signal undergoes inversion as a reference position, and counting a number of high values of the crank angle signal during which the cylinder identity signal is in a high state, with the initializing, establishing, and counting occurring if it is determined that the pulse of the cylinder identity signal has undergone inversion from low to high, and the reference position and the number of high values of the crank angle signal being output to an electronic control unit; counting a number of pulses of the crank angle signal for controlling the engine by the timer/counter if the cylinder identity signal does not undergo inversion from low to high; determining if the number of pulses of the crank angle signal has reached a predetermined number to control the engine; determining that a particular cylinder has reached TDC at a point where the number of pulses of the crank angle signal reaches the predetermined number; performing cylinder identification based on (a) the reference position stored in the electronic control unit, (b) the number of pulses of the crank angle signal counted when the cylinder identity signal is in a high state, and (c) the number of pulses of the crank angle signal for controlling the engine; determining if the number of pulses of the crank angle signal counted when the cylinder identity signal is in a high state equals a sum of the number of pulses of the crank angle signal for controlling the engine and a result of dividing the number of pulses of the crank angle signal during one period by a number of cylinders; and determining by the electronic control unit that a cylinder subsequent to that identified in the step of performing cylinder identification has reached TDC at a point where the number of pulses of the crank angle signal counted when the cylinder identity signal is in a high state.

According to a feature of the present invention, in the step of performing cylinder identification, if there is a number of counted pulses of the crank angle signal during a long high portion of the cylinder identity signal, a point at which the number of pulses of the crank angle signal reaches a predetermined number is determined to be where a particular cylinder reaches TDC.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1A:
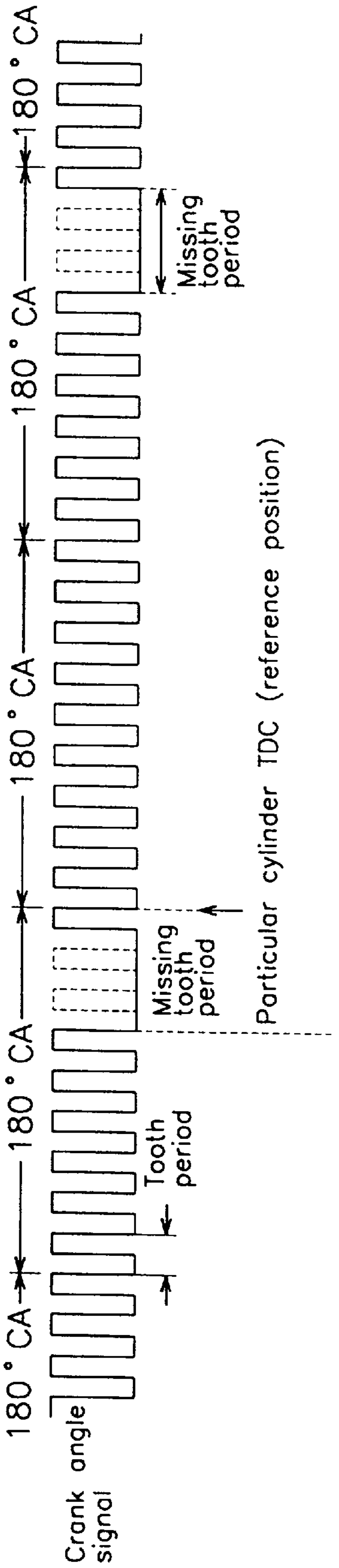
FIG. 1*a* shows a crank angle signal sensing method in a conventional system and method for processing crank angle signals.
Figure 1B:
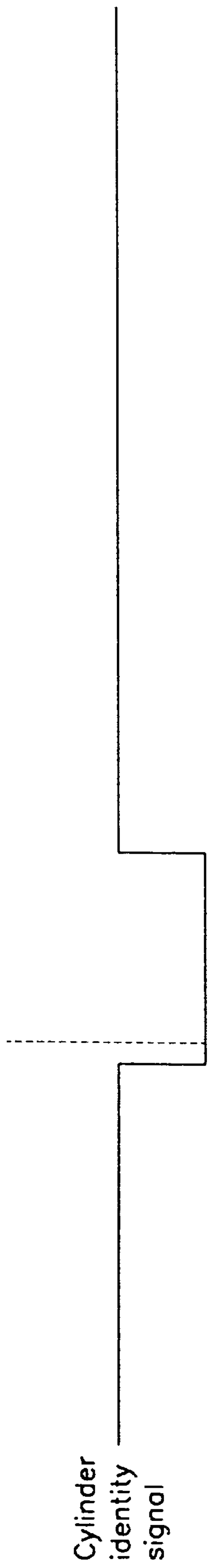
FIG. 1*b* is a waveform of a cylinder identity signal used to discern which cylinder is at a compression or exhaust TDC.
Figure 2:
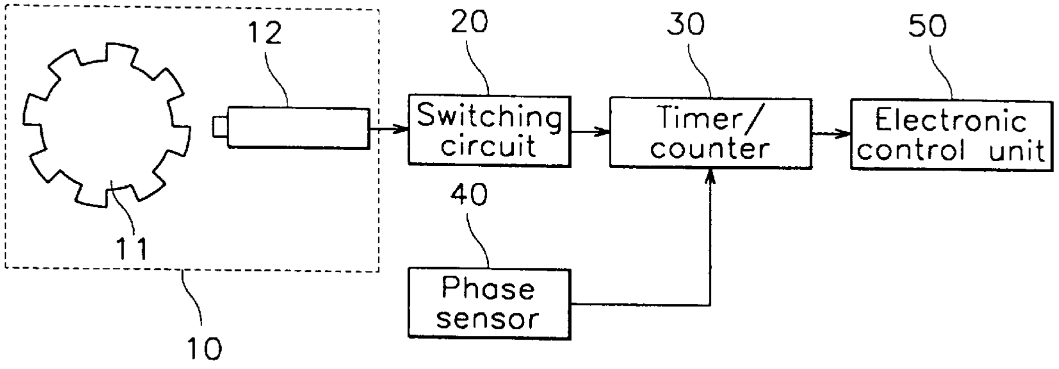
FIG. 2 is a block diagram of a system for processing crank angle signals according to a preferred embodiment of the present invention.

FIG. 2 shows a block diagram of a system for processing crank angle signals according to a preferred embodiment of the present invention.

The system comprises a crank angle sensor 10 including a sensor wheel 11, which is connected to a crankshaft, and a magnetic pickup 12 for outputting analog signals according to a rotation of the sensor wheel 11; a switching circuit 20 for converting the analog signals into digital signals (i.e., crank angle signals); a timer/counter 30 for detecting a tooth period of the crank angle signals and a number of pulses; a phase sensor 40 linked to a camshaft and which outputs a cylinder identity signal; and an electronic control unit (ECU) 50 for receiving output signals of the timer/counter 30 and the phase sensor 40 and using the signals to perform engine control.

A plurality of teeth spaced at predetermined intervals is formed around a circumference of the sensor wheel 11. With the rotation of the sensor wheel 11 through its connection with the crankshaft, changes in a magnetic field between the sensor wheel 11 and the magnetic pickup 12 are generated. That is, there occurs an alternating change in distance between the outer circumference of the sensor wheel 11 and the magnetic pickup 12 as a result of the teeth and gaps formed on the sensor wheel 11. Accordingly, as the sensor wheel 11 rotates, this change in distance between the teeth of sensor wheel 11 and the magnetic pickup 12, and between gaps between the teeth of the sensor wheel 11 and the magnetic pickup 12 generates changes in the magnetic field between these two elements. This is detected by the magnetic pickup 12, which then outputs corresponding analog signals.

The switching circuit 20 receives the analog signals from the magnetic pickup 12, converts the signals into digital crank angle signals, and outputs the crank angle signals. A high value of the crank angle signals corresponds to the teeth of the sensor wheel 11, and a low value of the crank angle signals corresponds to the gaps between the teeth of the sensor wheel 11.

Next, the timer/counter 30 receives the crank angle signals from the switching circuit 20, and setting points where the cylinder identity signal output from the phase sensor 40 converts from high to low and from low to high as a reference location, detects a tooth period of the crank angle signals and number of pulses after the reference locations. Using the tooth periods and number of pulses output from the timer/counter 30, the ECU 50 performs cylinder identification and detects engine rpm, after which the ECU 50 controls the engine.

Methods according to different preferred embodiments of the present invention to process crank angle signals will now be described in detail with reference to the drawings. The methods are those applied to the system for processing crank angle signals as described above.

Figure 3:
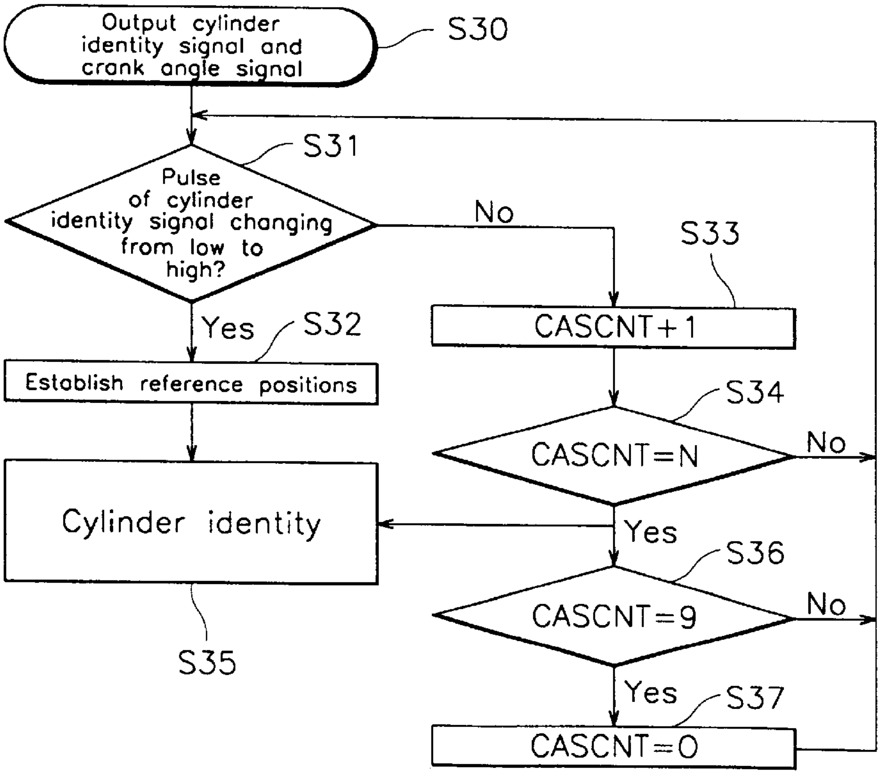
FIG. 3 is a flow chart of a method for processing crank angle signals according to a first preferred embodiment of the present invention.
Figure 4A:
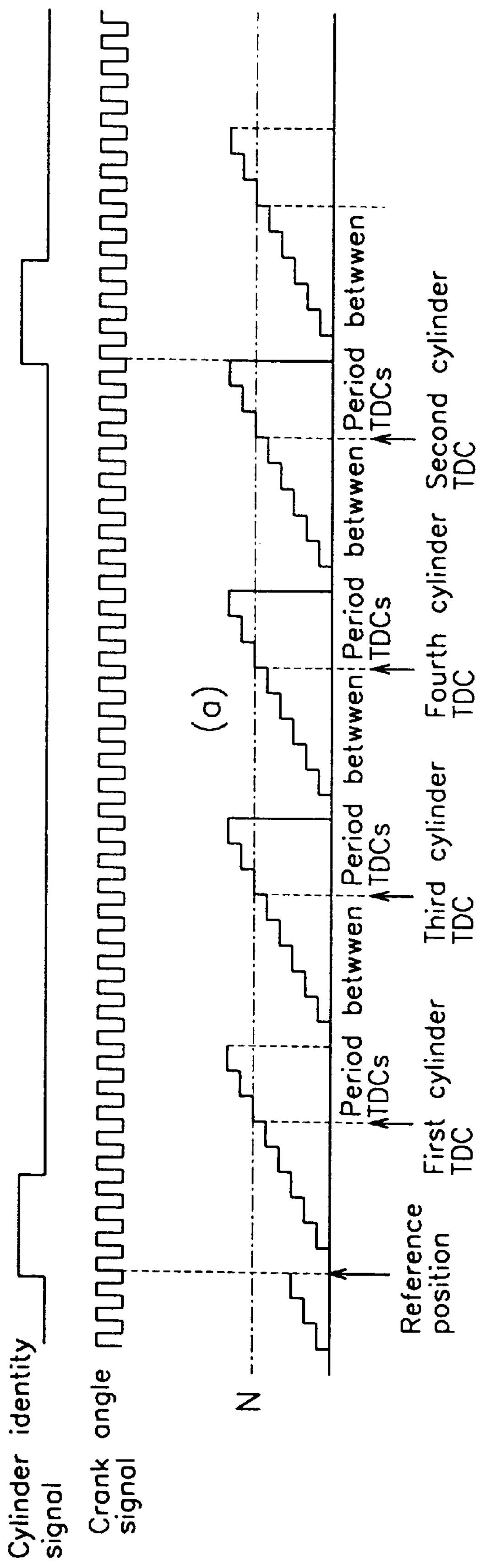
FIG. 4*a* is a waveform of a signal according to the first preferred embodiment of the present invention.

FIG. 3 shows a flow chart of a method for processing crank angle signals according to a first preferred embodiment of the present invention, and FIG. 4*a* shows a waveform of a signal according to the first preferred embodiment of the present invention.

The waveform of the signal shown in FIG. 4*a* is that in the case of a 4-cylinder engine in which power strokes occur in the order of a first cylinder, third cylinder, fourth cylinder and second cylinder. The cylinder identity signal is emitted once per period, and one period is defined as when the engine completes one cycle (i.e., when the camshaft rotates once), and a crank angle signal count (CASCNT) during one period is 36. Also, since periods between 4 TDCs appear every one cycle of the engine, a CASCNT of 9 occurs during a period between TDCs of one cycle. Such periods between TDCs refers to a time from which a cylinder performs a power stroke to a time when a subsequent cylinder performs a power stroke.

In the method of the first preferred embodiment of the present invention, the cylinder identity signal, output by the phase sensor 40, and the crank angle signal are transmitted to the timer/counter 30 in step S30. Next, the timer/counter 30 determines if a pulse of the cylinder identity signal is changing from low to high as shown in FIG. 4*a* in step S31. At this time, if it is determined that the cylinder identity signal is changing from low to high, the electronic control unit 50 establishes this point of change as a reference position for the calculation of rpm and cylinder identity in step S32. The reference position shown in FIG. 4*a* is the point of bottom dead center (BDC) of a compression stroke of the first cylinder, or 120° before TDC.

Further, in step S31, if it is determined that the cylinder identity signal is not changing from low to high, the timer/counter 30 counts the CASCNT one at a time in step S33. Next, the timer/counter 30 determines if the CASCNT is a predetermined number N (i.e., N=7) in step S34. Here, since the reference positions are established at first cylinder compression stroke BDC in step S32, the point at which N=7 is the point where the first cylinder is at the TDC as shown in FIG. 4*a*. Accordingly, if N=7 in step S34, the electronic control unit 50 determines that the first cylinder has reached TDC in step S35. However, if N does not equal 7 in step S34, the process returns to step S31.

After step S34, the timer/counter 30 determines if the CASCNT is 9 in step S36, and if it is, the timer/counter 30 initializes such that the CASCNT=0 in step S37, after which the process returns to step S31. Through the same process as described above, it is then determined by the electronic control unit 50 that the third cylinder has reached TDC, after which the same determination is made regarding the fourth cylinder then the second cylinder.

Therefore, the cylinder identity signal is used as described above to obtain reference positions, after which TDC periods are detected such that average rotational periods and rpm of each period are calculated between the TDCs.

In FIG. 4*a*, the detection of periods between TDCs every time the CASCNT increases by 9 is shown with the assumption that there is no missing tooth period. However, if there is a missing tooth period, it is possible to differently establish the reference value in step S36.

Accordingly, if the phase sensor 40 is malfunctioning or the cylinder identity signal is not detected, basic engine control can be performed using only the crank angle signal.

Figure 4B:
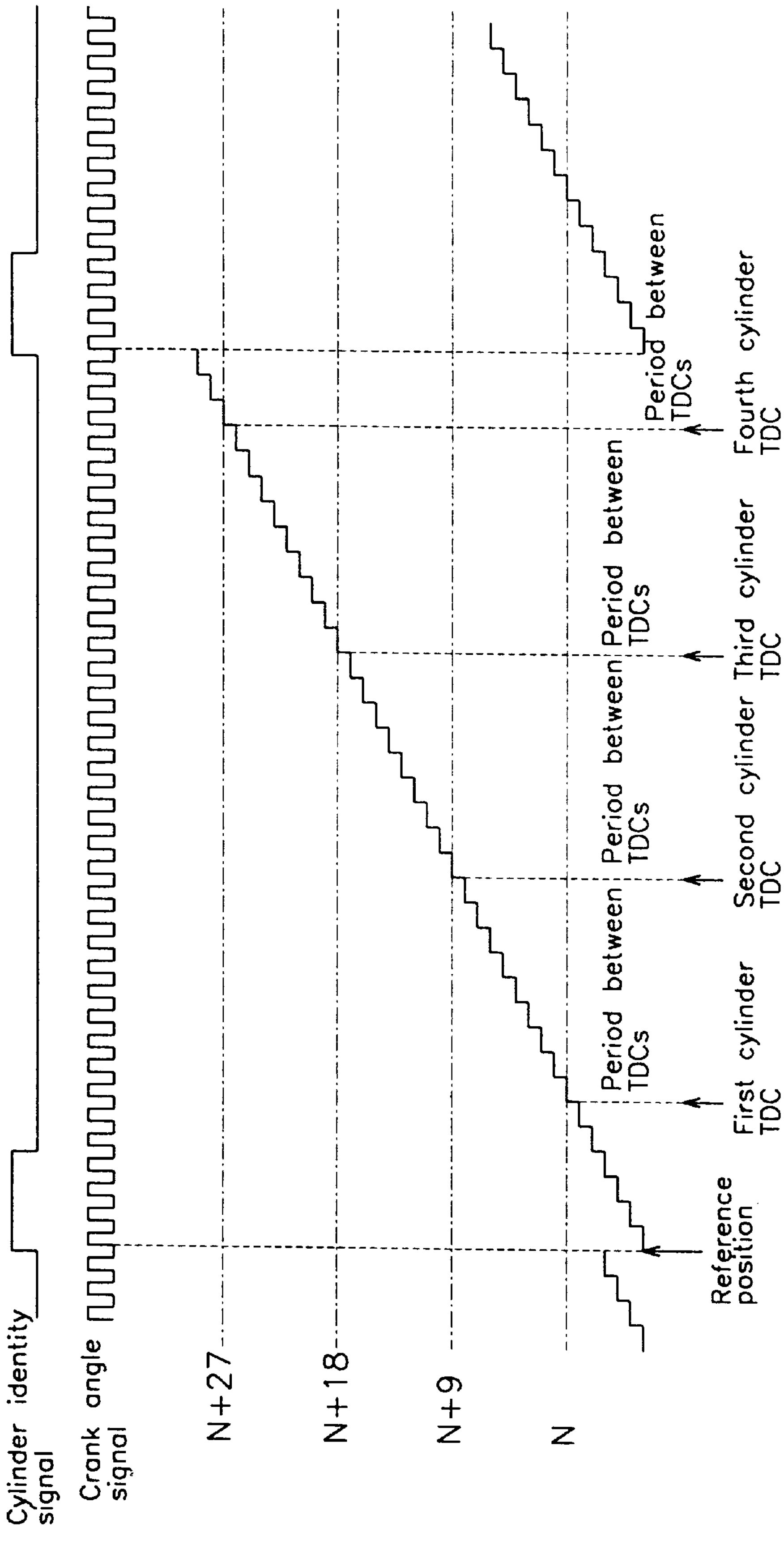
FIG. 4*b* is a waveform of a signal in which there is no initialization of a counter according to the first preferred embodiment of the present invention.

Further, FIG. 4*b* shows a waveform of a signal in which there is no initialization of the timer/counter 30 according to the first preferred embodiment of the present invention.

Figure 5:
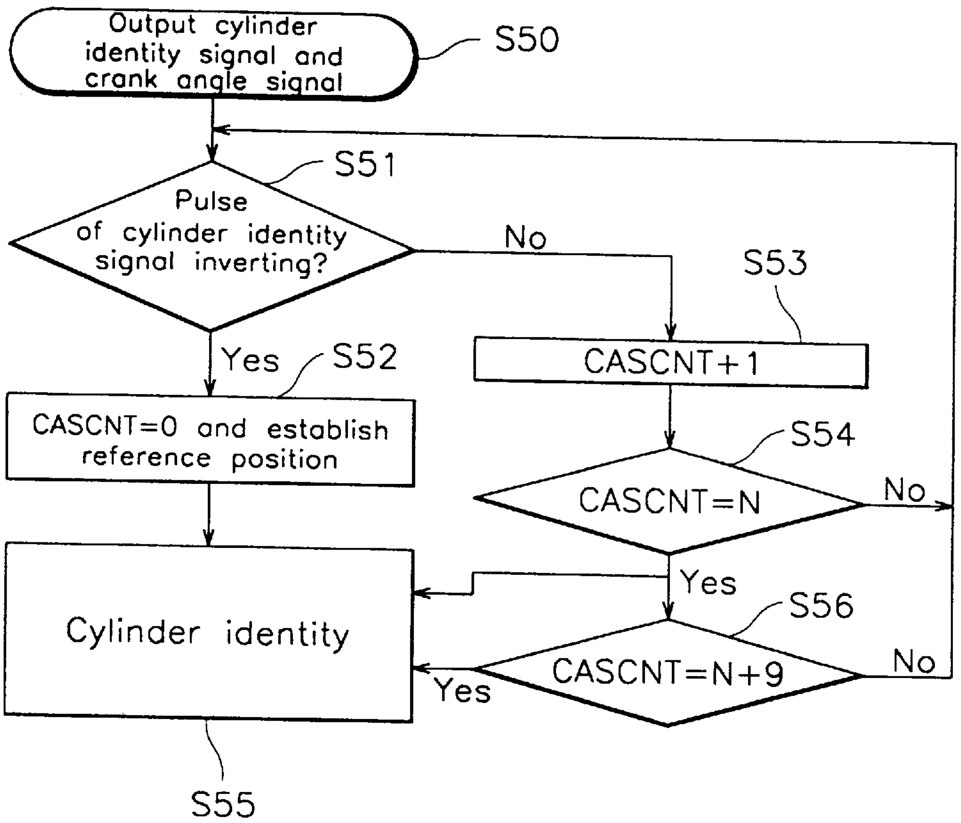
FIG. 5 is a flow chart of a method for processing crank angle signals according to a second preferred embodiment of the present invention.
Figure 6:
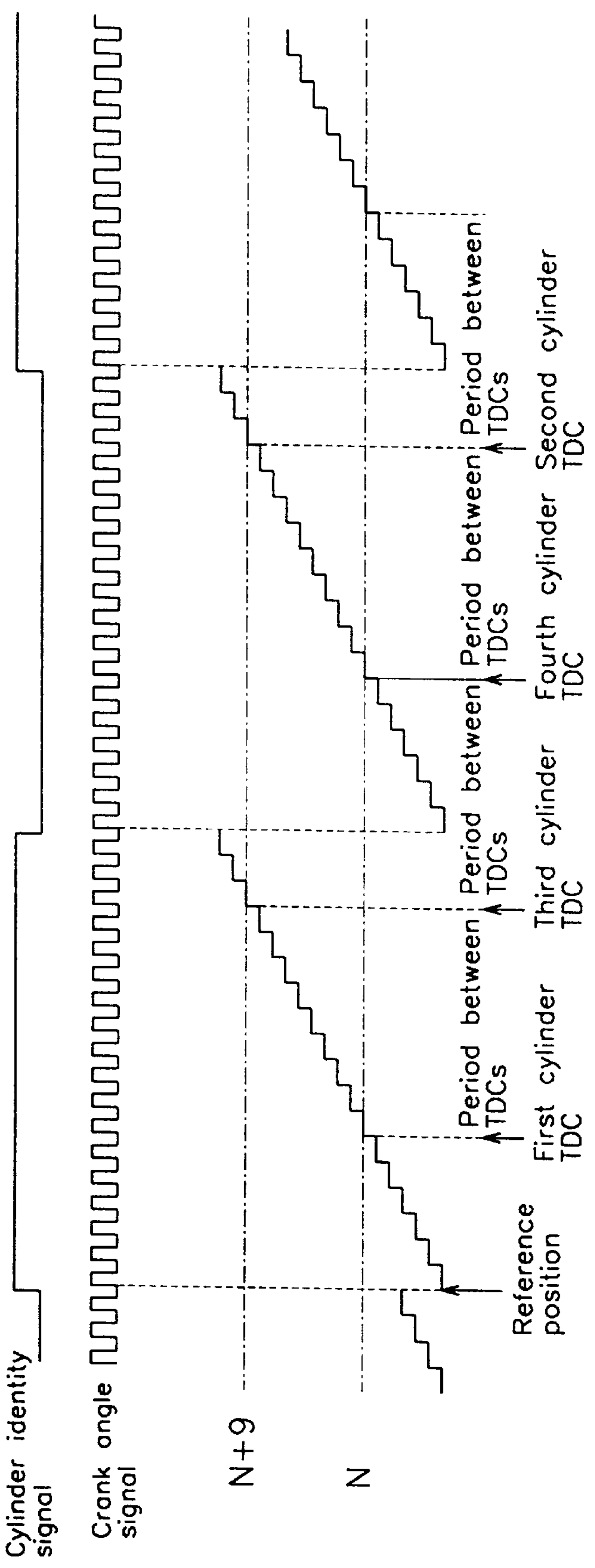
FIG. 6 is a waveform of a signal according to the second preferred embodiment of the present invention.

FIG. 5 is a flow chart of a method for processing crank angle signals according to a second preferred embodiment of the present invention, and FIG. 6 is a waveform of a signal according to the second preferred embodiment of the present invention. In FIG. 6, a pulse of the cylinder identity signal is at a high state over half a period.

In the second preferred embodiment of the present invention, if the crank angle signal begins to be detected when the cylinder identity signal, which detects one period every one rotation of the camshaft, is in a high state, calculation of cylinder identity and rpm can be delayed. Accordingly, as shown in FIG. 6, if the cylinder identity signal becomes high during one revolution of the engine, then low for one engine revolution, it is possible to calculate cylinder identity and rpm before the completion of one revolution of the crankshaft according to whether the cylinder identity signal has changed from low to high or from high to low.

First, in the method for processing crank angle signals according to the second preferred embodiment of the present invention, the cylinder identity signal, output by the phase sensor 40, and the crank angle signal are transmitted to the timer/counter 30 in step S50. Next, the timer/counter 30 determines if a pulse of the cylinder identity signal shown in FIG. 6 is inverting in step S51. In step S51, if the pulse of the cylinder identity signal is changing from low to high as shown in FIG. 6, the timer/counter 30 initializes such that CASCNT=0, and the electronic control unit 50 establishes this point of change as a reference position in step S52. The reference position shown in FIG. 4*a* is the point of a compression stroke bottom dead center (BDC) of the first cylinder.

After the above, if a subsequent pulse of the crank angle signal and a corresponding cylinder identity signal is input to the timer/counter 30 in step S50, since the pulse of the cylinder identity signal is not inverted, one is added to the CASCNT in step S53. Next, the timer/counter 30 determines if the value of the CASCNT is 7 in step S54, and if it is, the first piston is at the TDC and this information is stored in the electronic control unit 50 to identify the cylinder. Accordingly, the reference position and CASCNT=7 are stored in the electronic control unit 50. If the reference position is at a point where the pulse of the cylinder identity signal is changing from low to high as shown in FIG. 6, the electronic control unit 50 determines that the first cylinder has reached TDC at this point in step S55.

After the first piston reaches TDC, counting is performed until CASCNT=N+9 in step S56. If this information is transmitted to the electronic control unit 50, information of the reference position being at the point where the pulse of the cylinder identity signal changes from low to high and information of CASCNT=N+9 is input to the electronic control unit 50 such that it is determined that the third cylinder has reached TDC as shown in FIG. 6.

Subsequently, the point at which the cylinder identity signal changes from high to low is again established as the reference position, and the above process is again performed. As a result, the fourth cylinder and the second cylinder can be identified, and the period between the TDCs is detected so that rpm can be obtained.

Figure 7:
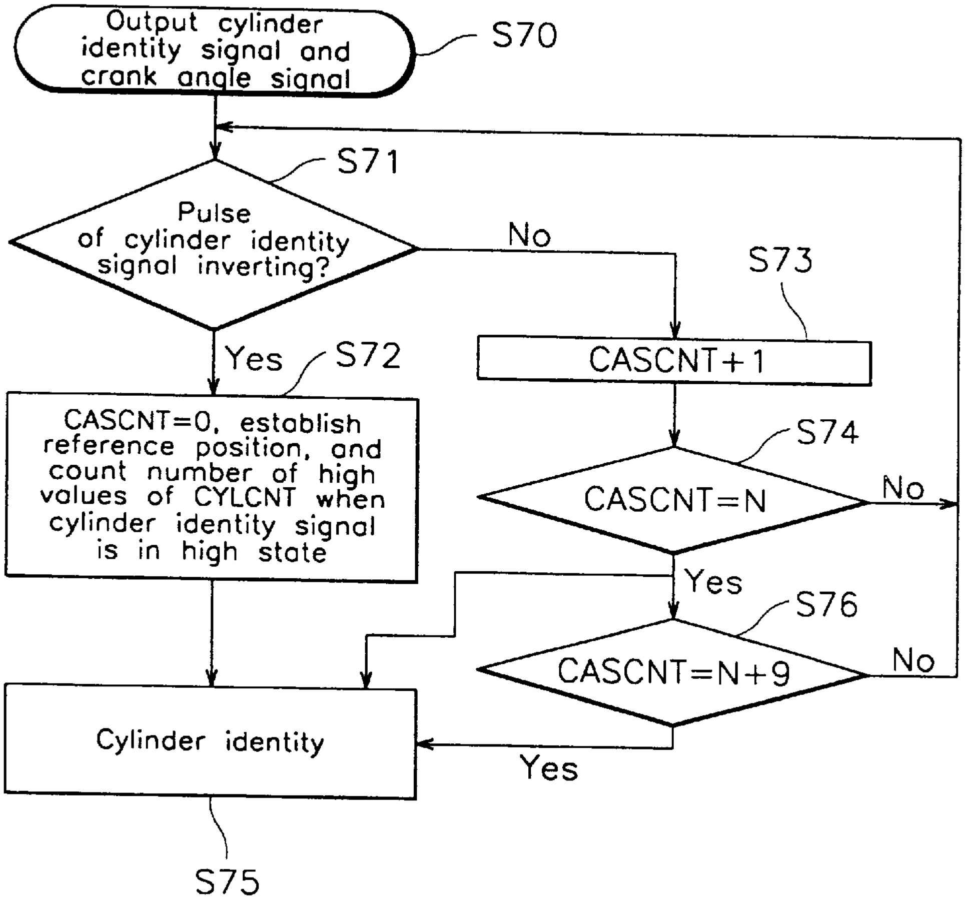
FIG. 7 is a flow chart of a method for processing crank angle signals according to a third preferred embodiment of the present invention.
Figure 8:
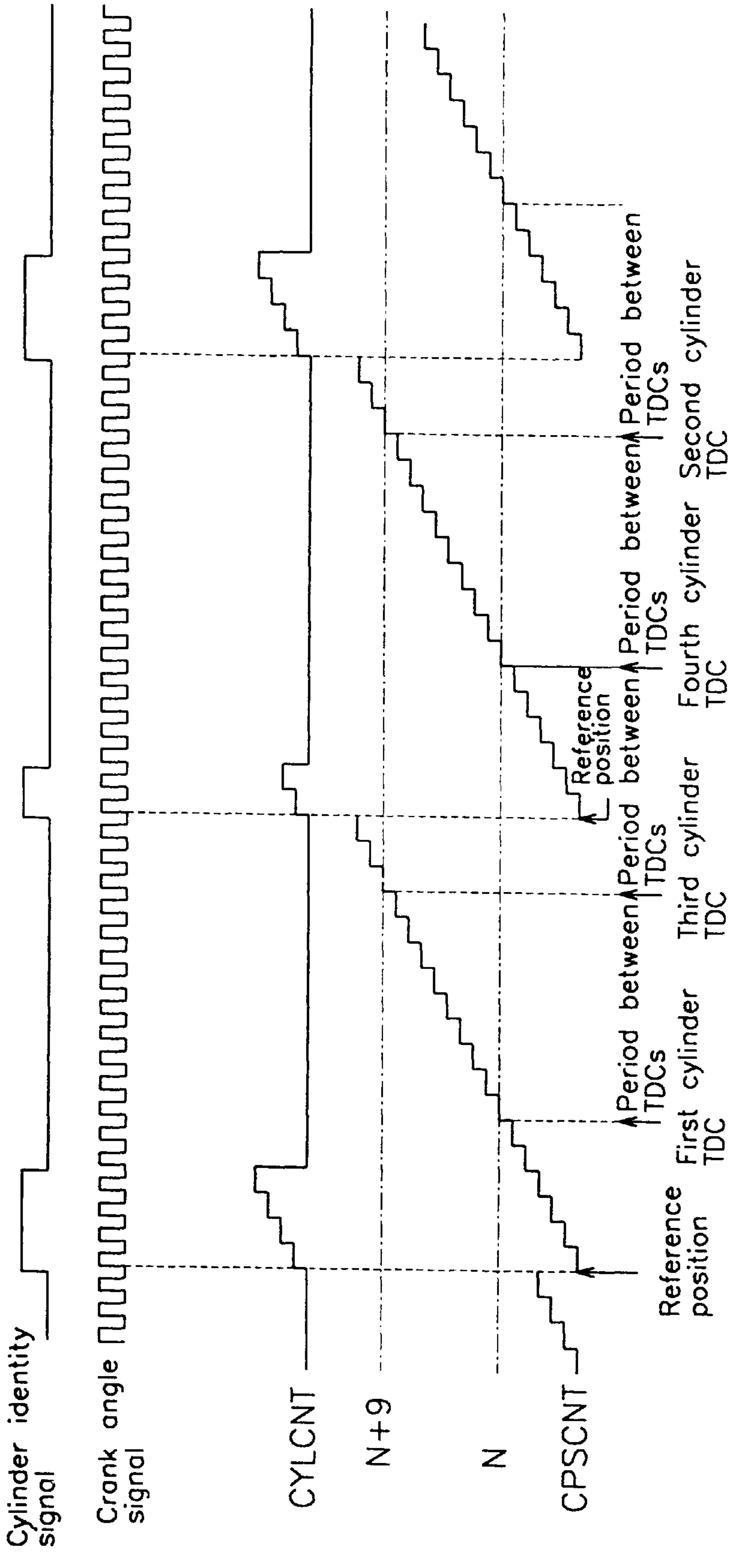
FIG. 8 is a waveform of a signal according to the third preferred embodiment of the present invention.

FIG. 7 is a flow chart of a method for processing crank angle signals according to a third preferred embodiment of the present invention, and FIG. 8 is a waveform of a signal according to the third preferred embodiment of the present invention. In the waveform shown in FIG. 8, the cylinder identity signal has two pulses with different widths during one period.

Unlike in the first preferred embodiment as shown in FIGS. 4*a* and 4*b* in which calculation of cylinder identity and rpm initially can be delayed up to a maximum of two revolutions of the crankshaft, in this embodiment, since a cylinder identity signal having a pulse of two different widths is used, it is possible to establish the reference position for calculation of cylinder identity and rpm within one revolution of the crankshaft.

First, the cylinder identity signal, output by the phase sensor 40, and the crank angle signal are transmitted to the timer/counter 30 in step S70. Next, the timer/counter 30 determines if the cylinder identity signal is changing from low to high in step S71. Next, in step S72, if it is determined that the cylinder identity signal is changing from low to high, the timer/counter 30 initializes the CASCNT and establishes this point (of initialization) as a reference position, and counts a number of high values of the crank angle signal (CYLCNT) during when the cylinder identity signal is in a high state, after which the timer/counter 30 provides this information to the electronic control unit 50.

In step S71, if the cylinder identity signal does not change from low to high, the timer/counter 30 increases a value of the CASCNT one step at a time in step S73. Next, the timer/counter 30 determines if the value of the CASCNT is a predetermined number N (i.e., N=7) in step S74, after which this information is stored in the electronic control unit 50.

Accordingly, information stored in the electronic control unit 50 includes the reference position, and the values of the CYLCNT and CASCNT. The electronic control unit 50 uses this information to determine cylinder identity in step S75. That is, if a large value results for the CYLCNT, the electronic control unit 50 determines that the first cylinder reached TDC using the CASCNT stored at that time.

Next, if the value of the CASCNT becomes N+9 in the timer/counter 30 in step S76, this information is output to the electronic control unit 50 such that it is determined the third cylinder is at TDC. Further, the timer/counter 30 detects the point at which the CASCNT value become N+9 at a period between TDCs, and outputs the same to the electronic control unit 50.

In the case where a small value for the CYLCNT results in step S72, the electronic control unit 50, as shown in FIG. 8, determines that the fourth cylinder has reached TDC if the value of the CASCNT becomes N in step S74, and determines that the second cylinder has reached TDC if the value of the CASCNT becomes N+9.

In the system and method for processing crank angle signals of the present invention as described above, since reference positions are established using cylinder identity signals, reliable rpm detection and cylinder identification is possible. This allows for more precise control in low speed states and during cold starts.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

For example, the value of the CASCNT can change according to the number of teeth on the sensor wheel 11, and the N value can vary according to the situation and system. Further, it is possible for the electronic control unit 50 to receive input of the cylinder identity signal output from the phase sensor 40 to determine the reference position. Finally, holes may be formed in the sensor wheel 11 instead of teeth, and the holes detected by a different type of sensor.

What is claimed is:

1. A system for processing crank angle signals comprising:

a crank angle sensor for converting a rotation of a crankshaft into analog signals, wherein the crank angle sensor comprises a sensor wheel having a plurality of teeth formed at predetermined intervals around a circumference of the sensor wheel, the sensor wheel being connected to the crankshaft; and a magnetic pickup for detecting variations in a magnetic field caused by a difference in distance between the teeth of sensor wheel and the magnetic pickup, and a gap between the teeth of the sensor wheel and the magnetic pickup, the difference in distance occurring as a result of a rotation of the sensor wheel;

a switching circuit for converting the analog signals into crank angle signals;

a timer/counter for detecting a number of pulses and tooth periods of the crank angle signals;

a phase sensor for converting a rotation of a camshaft into cylinder identity signals and outputting the cylinder identity signals; and an electronic control unit for receiving the crank angle signals and the cylinder identity signals and using the signals to determine cylinder identity and rpm.

2. A system for processing crank angle signals comprising:

a crank angle sensor for converting a rotation of a crankshaft into analog signals;

a switching circuit for converting the analog signals into crank angle signals;

a timer/counter for detecting a number of pulses and tooth periods of the crank angle signals;

a phase sensor for converting a rotation of a camshaft into cylinder identity signals and outputting the cylinder identity signals; and an electronic control unit for receiving the crank angle signals and the cylinder identity signals and using the signals to determine cylinder identity and rpm, wherein the timer/counter establishes points at which the cylinder identity signals, which are output from the phase sensor, undergo inversion from high to low states or vice versa as reference positions, then starting from the reference positions counts and outputs the pulses of the crank angle signals, and calculates and outputs a time until a predetermined number of the pulses is counted.

3. The system of claim 2 wherein the electronic control unit receives the number of pulses of the crank angle signals output from the timer/counter, then identifies a cylinder corresponding to the input pulses, and calculates engine rpm based on the time until the predetermined number of the pulses is counted determined by the timer/counter.

4. A method for processing crank angle signals comprising the steps of:

a) inputting a crank angle signal and a cylinder identity signal;

b) determining if the cylinder identity signal has undergone inversion from a high to low state or vice versa;

c) establishing a point at which the cylinder identity signal undergoes inversion as a reference position;

d) counting a predetermined number of pulses of the crank angle signal after the reference position if the cylinder identity signal does not undergo inversion; and e) identifying a point at which the predetermined number of the pulses of the crank angle signal is counted as a particular cylinder, wherein in the step a) in the event that the cylinder identity signal, that is, a short pulse, is provided, a method for processing crank angle signals comprises the steps of, inputting a cylinder identity signal output from a phase sensor and a crank angle signal to a timer/counter, the cylinder identity signal being a signal having a single short pulse, determining, by the timer/counter, if the pulse of the cylinder identity signal has undergone inversion from low to high, establishing, if it is determined that the pulse of the cylinder identity signal has undergone inversion, a point at which the cylinder identity signal undergoes inversion as a reference position and calculating rpm at this point, the establishing of the reference position and calculating of rpm being performed in an electronic control unit, counting, one at a time, a number of pulses of the crank angle signal by the timer/counter if the cylinder identity signal does not undergo inversion, determining if the number of pulses of the crank angle signal has reached a predetermined number, determining that a particular cylinder has reached TDC at a point where the number of pulses of the crank angle signal reaches the predetermined number, and initializing the timer/counter when the number of pulses of the crank angle signal counted by the timer/counter and a result of dividing the number of pulses of the crank angle signal during one period by a number of cylinders are the same.

5. The method of claim 4 further comprising the step of continuously counting the pulses of the crank angle signals during one period without initializing the timer/counter.

6. A method for processing crank angle signals comprising the steps of:

a) inputting a crank angle signal and a cylinder identity signal;

b) determining if the cylinder identity signal has undergone inversion from a high to low state or vice versa;

c) establishing a point at which the cylinder identity signal undergoes inversion as a reference position;

d) counting a predetermined number of pulses of the crank angle signal after the reference position if the cylinder identity signal does not undergo inversion; and e) identifying a point at which the predetermined number of the pulses of the crank angle signal is counted as a particular cylinder, wherein in the event that the cylinder identity signal is provided during a half cycle of the cylinder identity signal, a method for processing crank angle signals comprises the steps of, inputting a cylinder identity signal output from a phase sensor and a crank angle signal to a timer/counter, the cylinder identity signal being a signal having a pulse extending over half a period of the signal, determining, by the timer/counter, if the pulse of the cylinder identity signal has undergone inversion, initializing the timer/counter, then establishing, by an electronic control unit, a point at which the cylinder identity signal undergoes inversion as a reference position, the initialization of the timer/counter and the establishing of the reference position being performed if it is determined that the pulse of the cylinder identity signal has undergone inversion from low to high, counting a number of pulses of the crank angle signal by the timer/counter if the cylinder identity signal does not undergo inversion, determining if the number of pulses of the crank angle signal has reached a predetermined number for engine control, determining that a particular cylinder has reached TDC at a point where the number of pulses of the crank angle signal reaches the predetermined number, determining if the number of pulses of the crank angle signal counted by the timer/counter equals a sum of the predetermined number of pulses of the crank angle signal and a result of dividing the number of pulses of the crank angle signal during one period by a number of cylinders, and determining that a subsequent cylinder has reached TDC by the electronic control unit at a point where the number of pulses of the crank angle signal counted by the timer/counter equals the sum.

7. The method of claim 6 wherein in the step of determining, by the timer/counter, if the pulse of the cylinder identity signal has undergone inversion, a point where the pulse of the cylinder identity signal undergoes inversion from high to low and from low to high is established as the reference position.

8. A method for processing crank angle signals comprising the steps of:

a) inputting a crank angle signal and a cylinder identity signal;

b) determining if the cylinder identity signal has undergone inversion from a high to low state or vice versa;

c) establishing a point at which the cylinder identity signal undergoes inversion as a reference position;

d) counting a predetermined number of pulses of the crank angle signal after the reference position if the cylinder identity signal does not undergo inversion; and e) identifying a point at which the predetermined number of the pulses of the crank angle signal is counted as a particular cylinder, wherein in the event that pulses with different widths more than one pulse are provided, a method for processing crank angle signals comprises the steps of, inputting a cylinder identity signal output from a phase sensor and a crank angle signal to a timer/counter, the cylinder identity signal being a signal having two pulses of different widths;

determining, by the timer/counter, if the pulse of the cylinder identity signal has undergone inversion from low to high, initializing the timer/counter, establishing a point at which the cylinder identity signal undergoes inversion as a reference position, and counting a number of high values of the crank angle signal during when the cylinder identity signal is in a high state, each the initializing, establishing, and counting occurring if it is determined that the pulse of the cylinder identity signal has undergone inversion from low to high, and the reference position and the number of high values of the crank angle signal being output to an electronic control unit, counting a number of pulses of the crank angle signal for controlling the engine by the timer/counter if the cylinder identity signal does not undergo inversion from low to high, determining if the number of pulses of the crank angle signal has reached a predetermined number to control the engine, determining that a particular cylinder has reached TDC at a point where the number of pulses of the crank angle signal reaches the predetermined number, performing cylinder identification based on (a) the reference position stored in the electronic control unit, (b) the number of pulses of the crank angle signal counted when the cylinder identity signal is in a high state, and (c) the number of pulses of the crank angle signal for controlling the engine, determining if the number of pulses of the crank angle signal counted when the cylinder identity signal is in a high state equals a sum of the number of pulses of the crank angle signal for controlling the engine and a result of dividing the number of pulses of the crank angle signal during one period by a number of cylinders, and determining that a cylinder, subsequent to that identified in the step of performing cylinder identification, has reached TDC by the electronic control unit at a point where the number of pulses of the crank angle signal counted when the cylinder identity signal is in a high state the sum.

9. The method of claim 8 wherein in the step of performing cylinder identification, if there is a number of the counted pulses of the crank angle signal during a long high portion of the cylinder identity signal, a point at which the number of pulses of the crank angle signal becomes a predetermined number is determined to be where a particular cylinder reaches TDC.

10. The method of claim 8 wherein in the step of performing cylinder identification, if there is a number of the counted pulses of the crank angle signal during a short high portion of the cylinder identity signal, a point at which the number of pulses of the crank angle signal becomes a predetermined number to be where a subsequent cylinder reaches TDC.

11. A method for processing crank angle signals comprising the steps of:

inputting a cylinder identity signal output from a phase sensor and a crank angle signal to a timer/counter, the cylinder identity signal being a signal having a single short pulse, determining, by the timer/counter, if the pulse of the cylinder identity signal has undergone inversion from low to high;

establishing, if it is determined that the pulse of the cylinder identity signal has undergone inversion, a point at which the cylinder identity signal undergoes inversion as a reference position and calculating rpm at this point, the establishing of the reference position and calculating of rpm being performed in an electronic control unit;

counting, one at a time, a number of pulses of the crank angle signal by the timer/counter if the cylinder identity signal does not undergo inversion;

determining if the number of pulses of the crank angle signal has reached a predetermined number;

determining that a particular cylinder has reached TDC at a point where the number of pulses of the crank angle signal reaches the predetermined number; and initializing the timer/counter when the number of pulses of the crank angle signal counted by the timer/counter and a result of dividing the number of pulses of the crank angle signal during one period by a number of cylinders are the same.

12. The method of claim 11 further comprising the step of continuously counting the pulses of the crank angle signals during one period without initializing the timer/counter.

13. A method for processing crank angle signals comprising the steps of:

inputting a cylinder identity signal output from a phase sensor and a crank angle signal to a timer/counter, the cylinder identity signal being a signal having a pulse extending over half a period of the signal;

determining, by the timer/counter, if the pulse of the cylinder identity signal has undergone inversion;

initializing the timer/counter, then establishing, by an electronic control unit, a point at which the cylinder identity signal undergoes inversion as a reference position, the initialization of the timer/counter and the establishing of the reference position being performed if it is determined that the pulse of the cylinder identity signal has undergone inversion from low to high;

counting a number of pulses of the crank angle signal by the timer/counter if the cylinder identity signal does not undergo inversion;

determining if the number of pulses of the crank angle signal has reached a predetermined number for engine control;

determining that a particular cylinder has reached TDC at a point where the number of pulses of the crank angle signal reaches the predetermined number;

determining if the number of pulses of the crank angle signal counted by the timer/counter equals a sum of the predetermined number of pulses of the crank angle signal and a result of dividing the number of pulses of the crank angle signal during one period by a number of cylinders; and determining that a subsequent cylinder has reached TDC by the electronic control unit at a point where the number of pulses of the crank angle signal counted by the timer/counter equals the sum.

14. The method of claim 13 wherein in the step of determining, by the timer/counter, if the pulse of the cylinder identity signal has undergone inversion, a point where the pulse of the cylinder identity signal undergoes inversion from high to low and from low to high is established as the reference position.

15. A method for processing crank angle signals comprising the steps of:

inputting a cylinder identity signal output from a phase sensor and a crank angle signal to a timer/counter, the cylinder identity signal being a signal having two pulses of different widths;

determining, by the timer/counter, if the pulse of the cylinder identity signal has undergone inversion from low to high;

initializing the timer/counter, establishing a point at which the cylinder identity signal undergoes inversion as a reference position, and counting a number of high values of the crank angle signal during when the cylinder identity signal is in a high state, each the initializing, establishing, and counting occurring if it is determined that the pulse of the cylinder identity signal has undergone inversion from low to high, and the reference position and the number of high values of the crank angle signal being output to an electronic control unit;

counting a number of pulses of the crank angle signal for controlling the engine by the timer/counter if the cylinder identity signal does not undergo inversion from low to high, determining if the number of pulses of the crank angle signal has reached a predetermined number to control the engine;

determining that a particular cylinder has reached TDC at a point where the number of pulses of the crank angle signal reaches the predetermined number;

performing cylinder identification based on (a) the reference position stored in the electronic control unit, (b) the number of pulses of the crank angle signal counted when the cylinder identity signal is in a high state, and (c) the number of pulses of the crank angle signal for controlling the engine;

determining if the number of pulses of the crank angle signal counted when the cylinder identity signal is in a high state equals a sum of the number of pulses of the crank angle signal for controlling the engine and a result of dividing the number of pulses of the crank angle signal during one period by a number of cylinders; and determining that a cylinder, subsequent to that identified in the step of performing cylinder identification, has reached TDC by the electronic control unit at a point where the number of pulses of the crank angle signal counted when the cylinder identity signal is in a high state the sum.

16. The method of claim 15 wherein in the step of performing cylinder identification, if there is a number of the counted pulses of the crank angle signal during a long high portion of the cylinder identity signal, a point at which the number of pulses of the crank angle signal becomes a predetermined number is determined to be where a particular cylinder reaches TDC.

17. The method of claim 15 wherein in the step of performing cylinder identification, if there is a number of the counted pulses of the crank angle signal during a short high portion of the cylinder identity signal, a point at which the number of pulses of the crank angle signal becomes a predetermined number to be where a subsequent cylinder reaches TDC.

* * * * *